(12) United States Patent
Becker

(10) Patent No.: US 6,502,396 B2
(45) Date of Patent: Jan. 7, 2003

(54) TWO STAGE BRAKE VALVE

(75) Inventor: Manfred Becker, Frankenthal (DE)

(73) Assignee: Deere & Company, Moline, IL (US)

( * ) Notice: Subject to any disclaimer, the term of this patent is extended or adjusted under 35 U.S.C. 154(b) by 36 days.

(21) Appl. No.: 09/888,132

(22) Filed: Jun. 22, 2001

(65) Prior Publication Data

US 2002/0007635 A1 Jan. 24, 2002

(30) Foreign Application Priority Data

Jul. 18, 2000 (DE) .......................................... 100 34 787

(51) Int. Cl.⁷ ................................................ B60T 11/08
(52) U.S. Cl. .......................................... 60/578; 60/581
(58) Field of Search ................................... 60/578, 581

(56) References Cited

U.S. PATENT DOCUMENTS 4,455,831 A    6/1984  Maehara ...................... 60/574
5,239,828 A    8/1993  Gawlick ...................... 60/581

FOREIGN PATENT DOCUMENTS

DE    41 30 832 C1    9/1991
EP    0 534 309 A1    3/1993

*Primary Examiner*—Edward K. Look
*Assistant Examiner*—Michael Leslie

(57) ABSTRACT

A two-stage brake valve, has a pair of stages with different effective areas which become effective in succession upon an actuation of the valve, including a larger area fill chamber and a smaller area pressure chamber. A fill stage pressure relief valve is connected between the fill chamber and a reservoir. The relief valve includes a valve element, which is exposed to the pressure in the reservoir and spring force, and which is exposed to pressure in the fill chamber, so that it opens upon a pre-set brake pressure existing in the fill chamber. The relief valve also includes a pressure relief piston which can be exposed to the pressure in the fill chamber, and which can be exposed to the pressure in the pressure chamber. The piston has a free end which engages the valve element, and forces the valve element in its opening direction with increasing pressure difference between the pressure chamber and the fill chamber.

10 Claims, 4 Drawing Sheets

TWO STAGE BRAKE VALVE

BACKGROUND OF THE INVENTION

The present invention relates to two-stage brake valve.

A two-stage brake valve has two stages with different cross sectional areas which become effective in succession upon an actuation of the valve, in that initially the pressure in a larger diameter fill chamber, is applied in order to bring the valve into initial contact, and then the pressure in a smaller diameter pressure chamber is applied to generate the operating pressure. A fill stage pressure relief valve is connected between the fill chamber and a reservoir. This pressure relief valve has a valve element and a pressure relief piston which acts upon the valve element. The valve element is subject on the one hand to the pressure in the reservoir as well as a spring force and, on the other hand, the pressure in the fill chamber. It opens a connection between the fill chamber and the reservoir, when a pre-determined brake pressure in the fill chamber is reached and exceeded. The pressure relief piston is subject at one end to the pressure in the reservoir and can be subject at its other end to the pressure in the pressure chamber. With a free end it is in contact with the valve element, in order to force the valve element into the open direction with increasing pressure difference between the pressure chamber and the fill chamber.

Such a brake valve is described in U.S. Pat. No. 4,455,831 in which the valve element is configured as a ball which interacts with a valve seat in the valve housing. The valve element opens when the fluid pressure within the fill chamber reaches a certain predetermined target value. The pressure relief piston is a stepped piston whose larger piston section is guided in a cylinder bore and is provided with a circular groove that accepts a seal. The thinner piston section engages the ball with its end face. With increasing pressure in the pressure chamber the pressure relief piston is forced with increasing force against the ball in the direction of opening. In this way a constant operation is to be assured even upon a sudden actuation of the brake. By the use of the seal on the pressure relief piston, however, detrimental effects occur due to friction such as hysteresis and spongy brake response.

EP-A-0 534 309 describes a two-stage brake valve, in which a check valve is arranged between the fill chamber and the reservoir, which contains a ball which is forced against a valve seat by the force of a spring that opens upon a pre-set brake, pressure. In order to keep the required actuating force for the brake valve small and to avoid a sudden jump in the operating pressure during the transition between the fill stage and the pressure stage, the closing force of the spring can be controlled as a function of the pressure in the pressure chamber, in that this pressure acts upon a spool valve which, for its part, unloads the spring. This solution also provides for seals in order to avoid leakages which then brings about the disadvantages noted above.

SUMMARY

Accordingly, an object of this invention is to provide a valve which permits a direct response of the brake and a reduced hysteresis performance of the brake.

This and other objects are achieved by the present invention, wherein the valve elements as well as the pressure relief piston are configured as cylinder bodies. Each of these cylinder bodies is guided in an associated cylinder bore of the valve body in the form of a sliding fit. An appropriate clearance fit provides a clearance in which the space between the cylindrical piston and the associated bore is so small that any passage of fluid is largely avoided, so that no sealing element need be used, and nevertheless an easy sliding of the cylindrical piston is possible. The bores are preferably finished with a rubbing awl. Furthermore relatively long cylinder bodies are preferably used. Thereby a long channel is formed between the bore and the cylinder body that has a long sealing length that impedes any penetration by the fluid.

Due to the elimination of the sealing elements the valve reacts in its response immediately to actuating forces. The hysteresis effect is reduced considerably and the braking force can be modulated better. Furthermore the valve includes a fill stage pressure relief valve which provides a very simple, cost effectively manufactured configuration consisting of few components.

Preferably, at least one of the two cylinder bodies is a needle bearing roller which is a commercially available high precision component that is a mass-produced item commercially available at low cast. Since needle bearing rollers are usually relatively long, a long sealing length results that, together with the precision fit of the finely finished bore has a sealing effect that can seal adequately without supplementary sealing elements, in particular without elastomeric seals.

DETAILED DESCRIPTION

The figures show a manually actuated brake valve for an agricultural tractor. The brake valve includes two valve units 11, 13, each of which can be actuated by an associated right or left brake pedal (not shown), in order to make possible in a known manner a steering-brake operation. Each valve unit 11, 13 contains two shift stages, that permit the combination of lower pedal travel path and lower forces.

Figure 1:
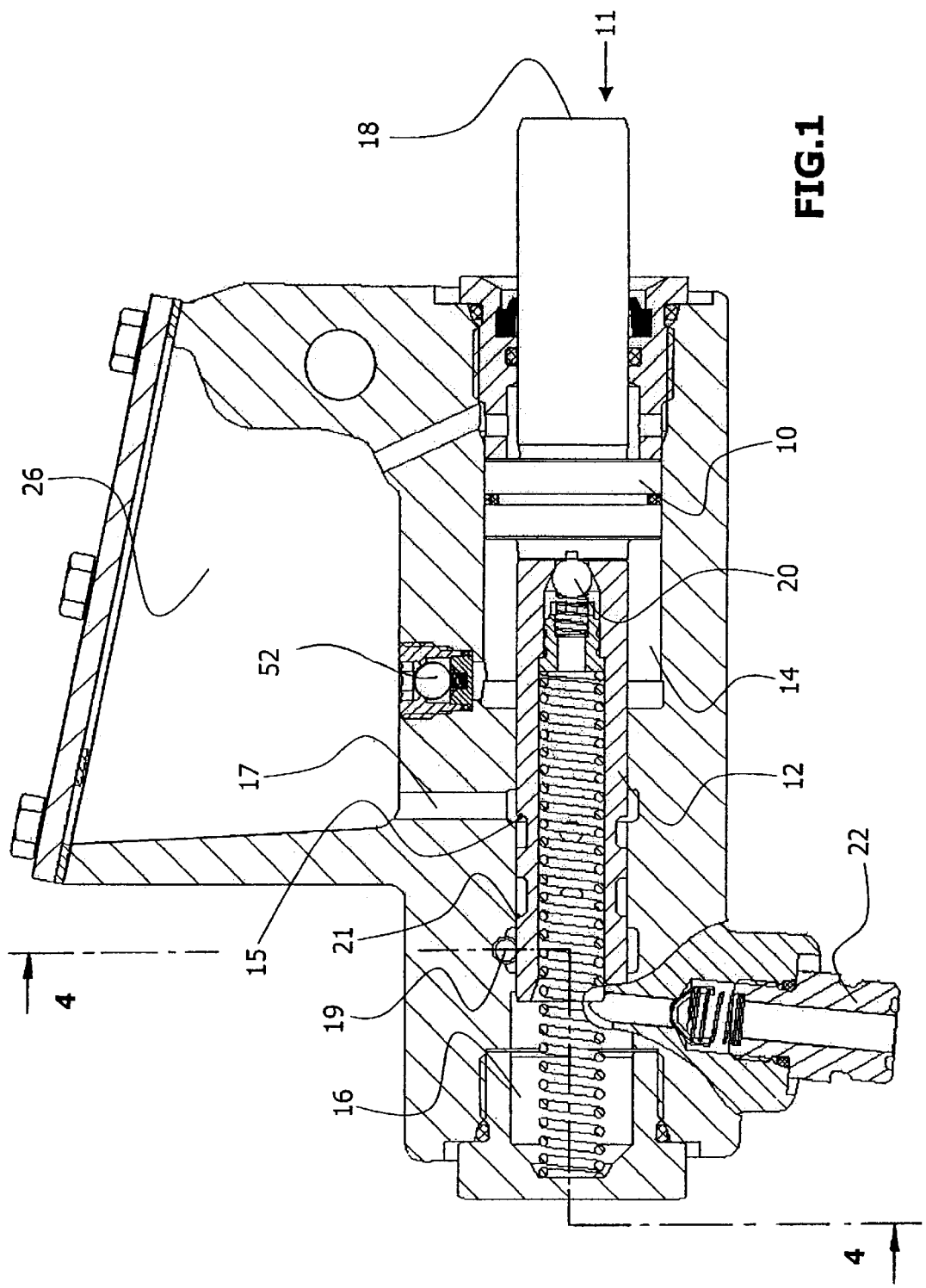
FIG. 1 is a sectional view of a two-stage brake valve according to the invention along section line 1—1 of FIG. 4.

Referring to FIG. 1, the stepped main cylinder of one of the two valve units 11, 13, engages two pistons of differing diameters—a larger diameter fill piston 10 and a smaller diameter pressure piston 12. The pressure chambers associated with the pistons 10, 12 are denoted as fill stage 14 and pressure stage 16.

By actuating the brake pedal (not shown) a force is applied to the piston end 18 and the fill piston 10 together with the pressure piston 12 is moved to the left. Thereby a first control edge 15 of the pressure piston 12 closes a channel 17, which connects the pressure stage 16 with a reservoir 26. Upon further movement of the piston 12 a second control edge 21 of the pressure piston 12 connects a brake pressure equalization channel 19 with the pressure stage 16. The brake pressure equalization channel 19 connects the stepped main pistons of the two valve units 11, 13 with each other.

Figure 2:
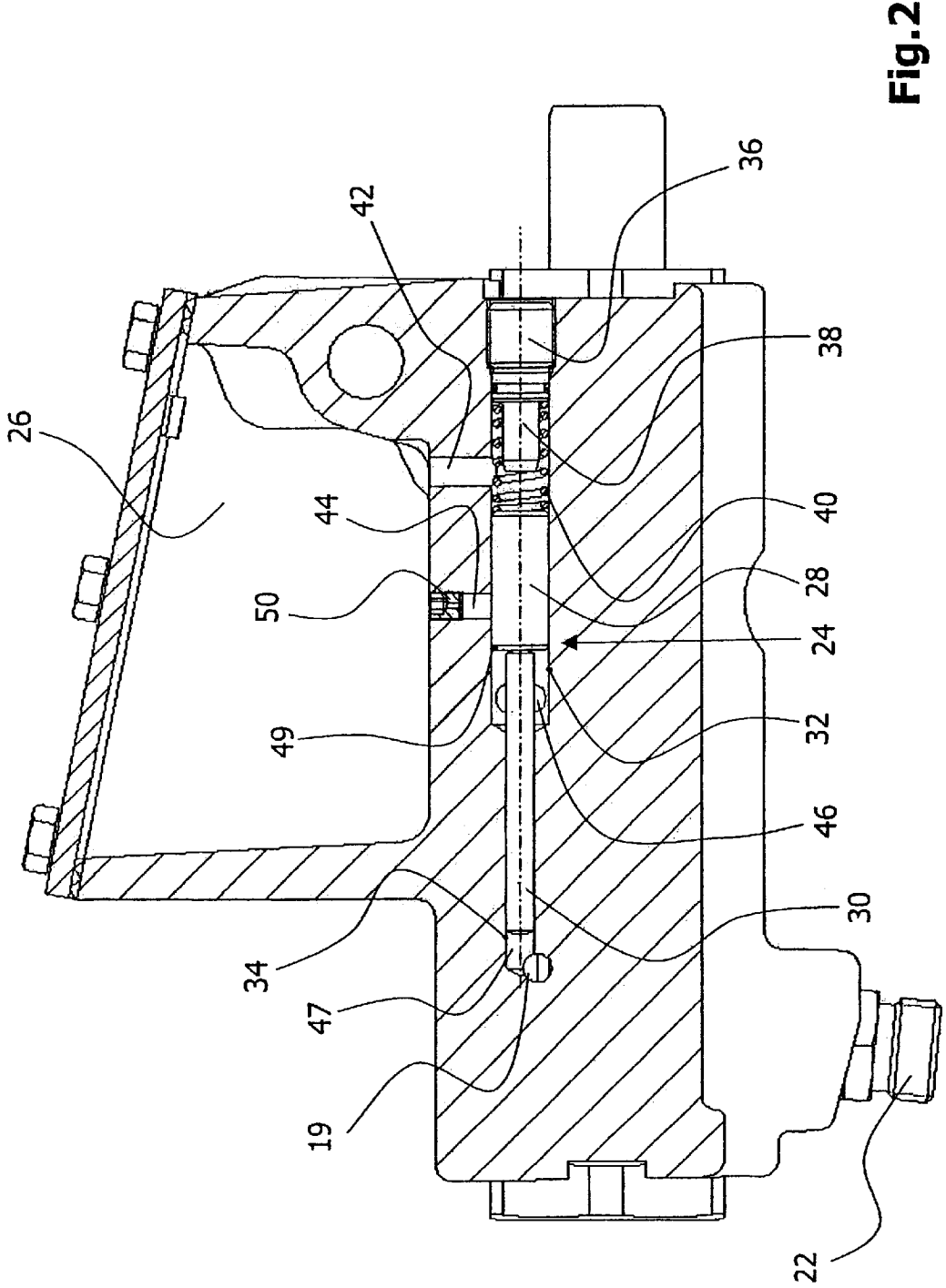
FIG. 2 is a sectional view of the brake valve along the section line 2—2 in FIG. 4.
Figure 3:
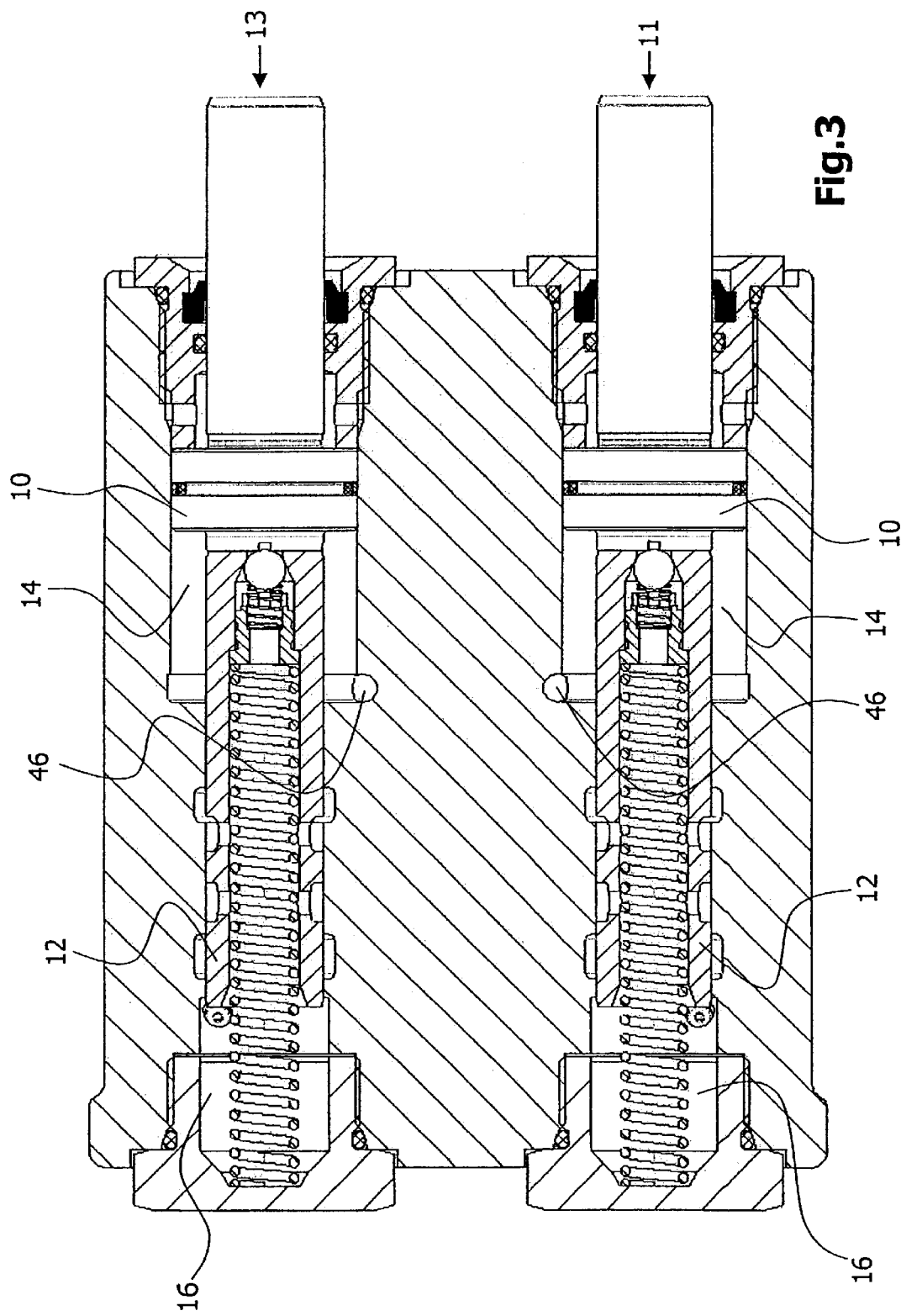
FIG. 3 is a sectional view of the brake valve along section line 3—3 in FIG. 4.

With the movement of the piston to the left a pressure is built up in the fill stage 14 through which a check valve 20 is opened so that brake fluid flows from the fill stage 14 through the check valve 20, the pressure stage 16 and a fitting 22 to the brake (not shown) and brings a brake disk (not shown) into engagement. When the brake disk is engaged no significant amount of fluid can drain away, so that the pressure in the fill stage 14 and in the pressure stage 16 increases further up to a brake pressure. When the brake pressure is reached a fill stage pressure relief valve 24 shown in FIG. 2 opens and connects the fill stage 14 with a reservoir 26. At approximately the same time the check valve 20 closes and the pressure in the pressure stage 16 increases further with increasing brake pedal force, so that the desired braking effect takes place.

The fill stage pressure relief valve 24 includes a valve element 28 which has a large diameter cylinder body and a small diameter cylinder body which forms a pressure relief piston 30. The valve element 28 can be moved axially in a larger diameter bore 32 and the pressure relief piston 30 can be moved axially in smaller diameter bore 34. The bodies 28, 30 are commercially available needle bearing rollers, which are made with tight tolerances. The cylinder bores 32, 34 are aligned with each other and form a stepped bore, and are preferably formed with high manufacturing precision and are finished with fine abrasive. With the associated cylinder bodies 28, 30 they form sliding sealing devices of high accuracy, which prevent fluid leakage to a high degree.

The stepped bore 32, 34 is closed by a stop 36. The stop 36 has a projection 38 which extends into the cylinder bore. 32 and limits the axial movement of the valve element 28. A helical compression spring 40 is arranged concentric to the projection 38 and is compressed between the stop 36 and the valve element 28, and forces the valve element 28 to the left, away from the stop 36.

The larger cylinder bore 32 is connected through a sump channel 42 and a pressure relief channel 44 with the reservoir 26 and through a fill stage channel 46, only partially visible, with the fill stage 14. The sump channel 42 communicates into the larger cylinder bore 32 in the region of the stop projection 38. The sump channel 42 cannot be closed by the valve element 28, so that the fluid pressure in the reservoir 26 is constantly applied to the right end face of the valve element 28. The fill stage channel 46 communicates with the larger cylinder bore 32 in a region left alongside the valve element 28, so that the fluid pressure in the fill stage 14 is constantly applied to the left end face of the valve element 28. On the other hand, the pressure relief channel 44 is closed by the valve element 28 when valve element 28 is in its rest position illustrated in FIG. 2. If, however, the pressure in the fill stage 14 becomes so great that it overcomes the pressure of the reservoir 26 and the force of the compression spring 40, the valve element 28 slides to the right and opens the pressure relief channel 44. The opening brake pressure is a function of the pressure of the reservoir 26 and the force of the compression spring 40.

The left end 47 of the smaller cylinder bore 34 is connected with the brake pressure equalization channel 19. When the brake piston 10, 12 is actuated and the second control edge 21 connects the brake equalization channel 19 with the pressure stage 16, the pressure of the pressure stage 16 is applied to the left end face of the pressure relief piston 30. On the other hand, the pressure of the fill stage 14 is applied to the right end face of the pressure relief piston 30. When the pressure of the pressure stage 16 is greater than the pressure of the fill stage 14, the pressure relief piston 30 is forced against the valve element 28. With increasing pressure difference the opposing force of the compression spring 40 is increasingly compensated, so that the opening pressure required for the valve element 28 decreases and the pressure of the fill stage 14 over the control edge 49 of the valve element 28 and the relief channel 44 is successively reduced.

During a braking operation, in which the brake pedal (not shown) is actuated with increasing force and the pistons 10, 12 are moved to the left, the system shifts automatically from the fill stage to the pressure stage, so that the check valve 20 closes at a pre-set pressure. Upon this shift, the braking force characteristic, shifts from a fill characteristic to a pressure characteristic.

With this pressure relief of the valve element 28, there are no abrupt discontinuities in the brake force characteristic, which could lead to an increase in the braking effect not expected by the operator.

When the brake is actuated rapidly, a rapid transition from the fill stage to the pressure stage occurs. Thereby, the pressure difference applied to the pressure relief piston 30 increases rapidly and moves the valve element 28, so that the pressure in the fill stage 14 is rapidly bled off through the fill stage channel 46 and the pressure relief channel 44, and this causes a further acceleration of the rate of increase in the pressure difference. Therefore, the brake force applied by the brake pedal (not shown) operates almost exclusively and immediately upon the pressure stage 16 and is not damped by a pressure "cushion" in the fill stage. This can lead to an unexpectedly rapid increase in the braking effect. In order to slow the rate of drainage from the fill stage 14 and thereby to avoid an excessive change in the course of the brake force characteristic upon the transition from the fill stage to the pressure stage, an orifice 50 is arranged in the pressure relief channel 44, which limits the rate of fluid drainage out of the larger cylinder bore 32. The effect of the orifice 50 increases with increasing brake actuation force.

Figure 4:
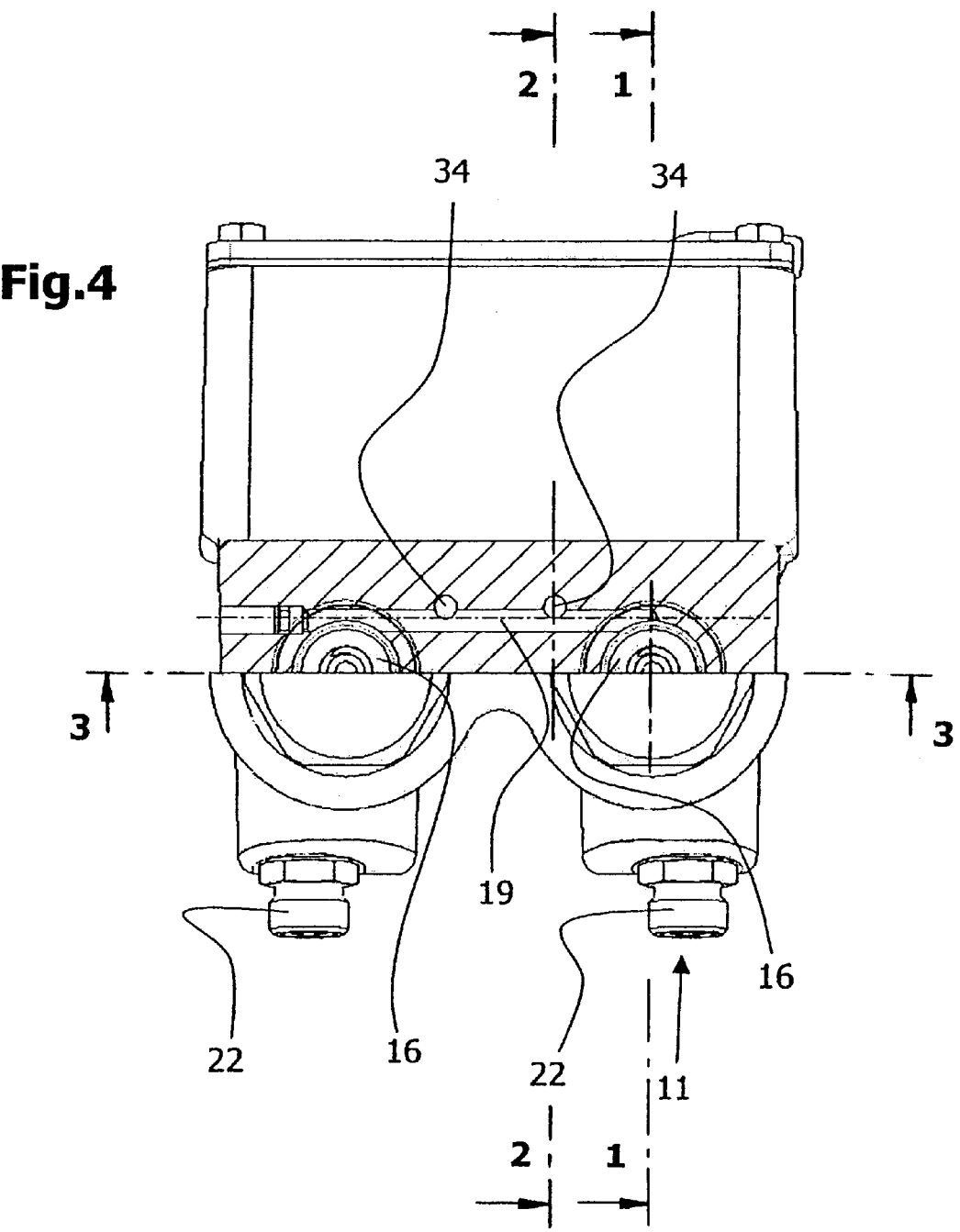
FIG. 4 is a partial sectional view of the brake valve along section line 4—4 of FIG. 1.

Referring now to FIG. 4, the stepped main cylinders of the two valve units 11, 13 are connected to each other through the brake pressure equalization channel 19. If both brake pedals are actuated, the pressure pistons 12 of both valve units 11, 13 are moved. Thereby, the second control edges 21 of the pressure pistons 16 each provide an opening between their pressure stages 16 and the brake equalization channel 19, so that both pressure stages 16 are connected to each other. Thus, all brakes are exposed to the same brake pressure, which avoids an unequal application of the brakes. The brake pressure is transmitted over the brake equalization channel 19 to both pressure relief pistons 30, so that the same relief pressure is applied to both valve elements 28. The two compression springs 40 of the two valve units 11,13 may be provided with different spring constants, so that the valve elements 28 react differently and do not open simultaneously but off-set in time. This leads to a further stabilization of the brake force characteristic, so that the transition from the fill stage to the pressure stage can no longer be felt by the operator. For the same purpose the stop 36 and/or the compression springs 40 of the two valve units 11,13 may be provided with differing lengths, so that the axial rest position, that is, the position in the condition without pressure, of the two valve elements 28 is unequal.

The fill stage 14 is connected with the reservoir 26 via a bleeder valve 52, through which brake fluid is sucked out of the reservoir 26 into the fill stage 14 upon release of the brake pedal, so that the piston 10 can return to its initial position.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A two-stage brake valve, wherein the stages become effective one after another upon an actuation of the valve, the brake valve having a larger area fill chamber and a smaller area pressure chamber, a fill stage pressure relief valve connected between the fill chamber and a reservoir, the relief valve having a valve element, which is operated on by reservoir pressure and a spring force and which is operated on by pressure in the fill chamber, so that the relief valve opens upon a pre-set brake pressure existing in the fill chamber, the relief valve also having a pressure relief piston which is exposed to the pressure in the fill chamber, which is exposed to the pressure in the pressure chamber and which has a free end which engages the valve element in order to force the valve element in an opening direction with increasing pressure difference between the fill chamber and the pressure chamber, characterized by:

the valve element and the pressure relief piston comprise cylindrical bodies which are sealingly and slidably received in corresponding cylinder bores in the valve housing without sealing elements.

2. The brake valve of claim 1, wherein:

at least one of the cylindrical bodies is a needle bearing roller.

3. The brake valve of claim 1, wherein:

the cylinder bores which receive the valve element and the pressure relief piston, have centerlines which are aligned with each other, and the cylinder bores form a stepped bore.

4. The brake valve of claim 1, further comprising:

a pressure relief channel which is connected with the reservoir and which communicates with the cylinder bore associated with the valve element; and a control edge which interacts with the pressure relief channel is formed on a side of the valve element facing the relief piston, the fill stage being communicated with the reservoir over the control edge after a certain brake pressure is reached.

5. The brake valve of claim 4, wherein:

an orifice is configured in the pressure relief channel.

6. The brake valve of claim 1, further comprising:

a stop which limits an opening stroke of the valve element.

7. The brake valve of claim 1, wherein the brake valve comprises:

a pair of valves for right and left vehicle brakes, a pair of cylinder bores which engage a pair of pressure relief pistons, the relief pistons having pressure stage sides which are hydraulically connected to each other by a brake pressure equalization channel.

8. The brake valve of claim 1, wherein the brake valve comprises:

a pair of fill stage pressure relief valves which open at different pressures.

9. The brake valve of claim 8, comprising:

a first fill stage pressure relief valve having a first spring operating on a first valve element; and a second fill stage pressure relief valve having a second spring operating on a second valve element, the first and second springs having different characteristics.

10. The brake valve of claim 9, wherein:

the first and second valve elements have different axial rest positions.

* * * * *